(12) United States Patent
Khabiri et al.

(10) Patent No.: US 12,073,152 B2
(45) Date of Patent: *Aug. 27, 2024

(54) VEHICLE ASSET MODELING USING LANGUAGE PROCESSING METHODS

(71) Applicant: INTERNATIONAL BUSINESS MACHINES CORPORATION, Armonk, NY (US)

(72) Inventors: Elham Khabiri, Briarcliff Manor, NY (US); Anuradha Bhamidipaty, Yorktown Heights, NY (US); Robert Jeffrey Baseman, Brewster, NY (US); Chandrasekhara K. Reddy, Kinnelon, NJ (US); Srideepika Jayaraman, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1073 days.

This patent is subject to a terminal disclaimer.

(21) Appl. No.: 16/933,977

(22) Filed: Jul. 20, 2020

(65) Prior Publication Data
US 2022/0019708 A1    Jan. 20, 2022

(51) Int. Cl.
*G06F 30/15* (2020.01)
*G06F 30/27* (2020.01)
*G06F 40/40* (2020.01)

(52) U.S. Cl.
CPC .............. *G06F 30/15* (2020.01); *G06F 30/27* (2020.01); *G06F 40/40* (2020.01)

(58) Field of Classification Search
CPC .......... G06F 30/15; G06F 40/40; G06F 30/27
See application file for complete search history.

(56) References Cited

U.S. PATENT DOCUMENTS 10,360,507 B2    7/2019   Aravamudan
10,559,180 B2    2/2020   Pourmohammad et al.
(Continued)

OTHER PUBLICATIONS

D. C. Elton, D. Turakhia, Z. Boukouvalas, R. M. Doherty, N. Reddy, M. D. Fuge, P. W. Chung, "Using Natural Language Processing Techniques to Extract Information on the Proeprties and Functionalities of Energetic Materials from Large Text Corpora" pp. 1-10, (Year: 2019).*

(Continued)

*Primary Examiner* — Kibrom K Gebresilassie
(74) *Attorney, Agent, or Firm* — Intelletek Law Group, PLLC; Gabriel Daniel, Esq.

(57) ABSTRACT

A computing device includes a processor and a storage device. A vehicle asset modeling module is stored in the storage device and is executed by the processor to configure the computing device to perform acts of identifying and clustering a plurality of assets based on static properties of a vehicle asset using a first module of the vehicle asset modeling module. The clustered plurality of assets is determined based on dynamic properties of the vehicle asset using a second module. Event prediction is performed by converting a numeric data of the clustered plurality of assets to a natural language processing (NLP) domain by a third module. One or more sequence-to-sequence methods are performed to predict a malfunction of a component of the vehicle asset and/or an event based on past patterns. Prediction information is stored in the storage device.

20 Claims, 11 Drawing Sheets

(56) References Cited

U.S. PATENT DOCUMENTS

| | | |
|---|---|---|
| 2003/0229410 A1 | 12/2003 | Smith et al. |
| 2014/0200951 A1* | 7/2014 | Hampapur ............ B61L 23/042 705/7.28 |
| 2017/0200264 A1 | 7/2017 | Park et al. |
| 2019/0354883 A1 | 11/2019 | Aravamudan et al. |

OTHER PUBLICATIONS

Mell, P. et al., "Recommendations of the National Institute of Standards and Technology"; NIST Special Publication 800-145 (2011); 7 pgs.

Elton, D. C. et al., "Using Natural Language Processing Techniques to Extract Information on the Properties and Functionalities of Energetic Materials From Large Text Corpora"; arXiv:1903.00415v1 [cs.CL] (2019); 10 pgs.

Baly, R. et al., "Wafer Classification Using Support Vector Machines"; IEEE (2012); vol. 25:2; pp. 373-383.

Khabiri, E. et al., "Industry Specific Word Embedding and its Application in Log Classification"; CIKM (2019); 9 pgs.

Young, T. et al., "Recent Trends in Deep Learning Based Natural Language Processing"; arXiv:1708.02709v8 (2018).

Qiu, X. et al., "Pre-Trained Models for Natural Language Processing: A Survey"; Research Gate (2020); 28 pgs.

Yang, H. et al., "Method and System for Prediction of Large Scale Conversion Rate (CVR) through Dynamic Transfer Learning of Global and Local Features"; IP.Com (2017).

Zhang, Z. et al., "Machine Reading Comprehension: The Role of Contextualized Language Models and Beyond"; arXiv:2005.06249v1 [cs.CL] (2020); 51 pgs.

Garrett, Z. "Machine Learning to Predict Advertisement Targeting Solutions"; Technical Disclosure Commons, Defensive Publications Series (2017); 35 pgs.

List of IBM Patents or Patent Applications Treated as Related, 2 pgs.

* cited by examiner

Input data (Vehicles) – Static data

400

405

- Can be derived for vehicles based on discriminating conditions which represent what a "good" asset would be –
  - For eg: number of MILs <50
  - frequency of alarm_X < 10 weeks

FIG. 4

VEHICLE ASSET MODELING USING LANGUAGE PROCESSING METHODS

BACKGROUND

Technical Field

The present disclosure generally relates to asset modeling in IoT domains, and more particularly, to predict the behavior of assets using natural language processing.

Description of the Related Art

There are typically two types of data available for assets modeling: (1) Static data, such as the make, model, and manufacturing information, etc., and (2) dynamic data, such as the operational data, sensors, and alarms. Dynamic data has the ability to indicate when a failure may occur, and based on their characteristics, it can be determined whether an asset is "good" or "bad."

Assets can be grouped into coherent clusters according to their static and dynamic characteristics. Dynamic data can lack structure and can be grouped according to certain techniques. For example, dynamic data can be grouped together based on certain characteristics in the areas of security, lifecycle management, and operational needs.

When dynamic data has alarms, there would be a benefit to predict failure (both catastrophic and non-catastrophic) if failure events or target events could be anticipated before alarms are activated, or a hard failure occurs. Such predictive capability would also provide an explanation for the behavior of assets based on the history of behavior, to permit the prediction of good assets, and would permit corrective action to reduce waste and costs.

SUMMARY

According to an embodiment, a computing device includes a processor and a storage device. A vehicle asset modeling module is stored in the storage device and is executed by the processor to configure the computing device to perform acts of identifying and clustering a plurality of assets based on static properties of a vehicle asset using a first module of the vehicle asset modeling module. The clustered plurality of assets is determined based on dynamic properties of the vehicle asset using a second module of the vehicle asset modeling module. Event prediction is performed by converting a numeric data of the clustered plurality of assets to a natural language processing (NLP) domain by a third module of the vehicle asset modeling module. One or more sequence-to-sequence methods are performed to predict a malfunction of a component of the vehicle asset and/or an event based on past patterns. Prediction information is stored in the storage device. The generation of the prediction information can be provided to a user of an additional monitoring system, to take corrective action prior to a failure of operations. Additional benefits include providing an entity or user with the prediction information to determine a root cause of alarms and/or events, and in the case of vehicles, to modify a manufacturing process and reduce waste by determining which alarms can be preemptively addressed to prevent a vehicle breakdown.

In one embodiment, the static properties of the assets include static data including one or more of a make, model, or manufacturing information of each of the assets. The dynamic properties of the assets include dynamic data including one or more of operational data, sensor data, and alarm data. The third module is configured to convert one or more of the static data and the dynamic data to the NLP domain by finding word representations using at least one of a Bag-of-Words model, a term frequency-inverse document frequency (TF-IDF), or a word vectorization.

In one embodiment, the numeric data is converted from an Internet of things (IoT) domain to the NLP domain by creating a word embedding model of the numeric data performing at least one of a cluster analysis, a difference measurement analysis, or a predictive model development.

In one embodiment, the rating of the one or more assets determined by the second module comprises a description based on a conditional characteristic.

In one embodiment, the numeric data is converted from a vehicle domain to the NLP domain by creating a word embedding model of the numeric data of a vehicle monitoring. The second module is configured to determine a rating of a plurality of vehicle assets.

In one embodiment, the word embedding model of the numeric data is created using at least one of a Bag-of-Words (BOW) model, a term frequency-inverse document frequency (TF-IDF), or word vectorization.

In one embodiment, one or more of the plurality of the vehicle's assets is rated as one of good or bad according to the determined rating.

In one embodiment, the third module is further configured to create the word embedding model of the numeric data to use the BOW model to determine BOW vectors.

In one embodiment, the third module is further configured to create the word embedding model of the numeric data by the TF-IDF.

In one embodiment, the third module is configured to create the word embedding by forming words based on unit buckets comprising a predetermined distance for each bucket.

In one embodiment, a computer-implemented method for vehicle asset modeling using natural language processing includes clustering a plurality of vehicle assets based on static properties of a vehicle. The static properties include static data including one or more of a make, a model, or a manufacturing information of each of the vehicle assets. A rating of one or more assets of the plurality of vehicle assets is determined based on dynamic properties of dynamic data that include one or more of operational data, sensor data, or alarm data. A target event or a failure event is predicted by converting a numeric data of the plurality of the vehicle assets to a natural language processing (NLP) domain. One or more sequence-to-sequence methods are performed to predict alarms and target events based on past patterns.

In one embodiment, one or more of the static data and the dynamic data are converted to the NLP domain by finding word representations using at least one of a Bag-of-Words model, a term frequency-inverse document frequency (TF-IDF), or a word vectorization.

In one embodiment, the numeric data is converted from an Internet-of-things (IoT) domain to the NLP domain by creating a word embedding model of the numeric data performing at least one of a cluster analysis, a difference measurement analysis, or a predictive model development.

In one embodiment, the determining of the rating of the one or more assets is based on a conditional characteristic.

In one embodiment, a word embedding model of the numeric data of a vehicle monitoring is created by converting the numeric data from a semiconductor domain to the NLP domain, and determining a rating of a plurality of vehicle assets.

In one embodiment, the creating of the word embedding model of the numeric data is performed by using at least one of a Bag-of-Words (BOW) model, a term frequency-inverse document frequency (TF-IDF), or a word vectorization.

In one embodiment, the creating of the word embedding model of the numeric data by the BOW model includes determining BOW vectors.

In one embodiment, the word embedding model of the numeric data by the TF-IDF includes creating rows and columns.

In one embodiment, one or more of the plurality of vehicle assets is rated as one of good or bad.

In one embodiment, a method for identifying candidate root causes of differences in a vehicle's features includes determining one or more identifying elements of a product's production history by creating a word embedding model of the production history elements. A subsequent analysis of the word embedding is performed, including at least one of a cluster analysis, a difference measure analysis, and or a predictive model development; and a root candidate root causes of differences in the vehicle's features are identified.

BRIEF DESCRIPTION OF THE DRAWINGS

The drawings are of illustrative embodiments. They do not illustrate all embodiments. Other embodiments may be used in addition to or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

FIG. 4 illustrates the identifying of "good" assets of vehicles, consistent with an illustrative embodiment.

DETAILED DESCRIPTION

Overview

In the following detailed description, numerous specific details are set forth by way of examples to provide a thorough understanding of the relevant teachings. However, it should be understood that the present teachings may be practiced without such details. In other instances, well-known methods, procedures, components, and/or circuitry have been described at a relatively high-level, without detail, to avoid unnecessarily obscuring aspects of the present teachings.

As used herein, the term "event" is used to refer to an action or an occurrence detected by an application. Events can include user actions, or system occurrences that can require a system response. For example, low memory conditions, excessive retry operations, may all be considered as error events and/or failure events depending on the severity of the issue. Target events include scheduled operations of an application.

As discussed herein in various illustrative embodiments, the computer-implemented method provides for the clustering of assets based on static properties, and takes into consideration the dynamic properties of the clustered assets. An advantage if such asset modeling is that failure prediction and event prediction is facilitated. In the domain of vehicle asset modeling, the monitoring of vehicles is facilitated in part by determining whether various vehicle assets should be considered "good" assets or "bad" assets. Thus, the monitoring, pre-emptive repair actions manufacturing of vehicles can be increased in terms of better efficiency in manufacturing with reduced defects.

The computer-implemented system and method provide for an improvement in the efficiency of computer operations. For example, by virtue of the teachings herein, a reduction in the amount of processing power is provided, as well as a reduction in the use of computer memory. Language processing is used to label elements from a production history to create a word embedding model that provides for a more efficient vehicle monitoring process and a vehicle manufacturing process than known before. By clustering "good" assets of vehicle models, the vehicles can be determined as being "good" (o "bad"). A benefit in cost reduction and production quality results.

Example Architecture

Figure 1:
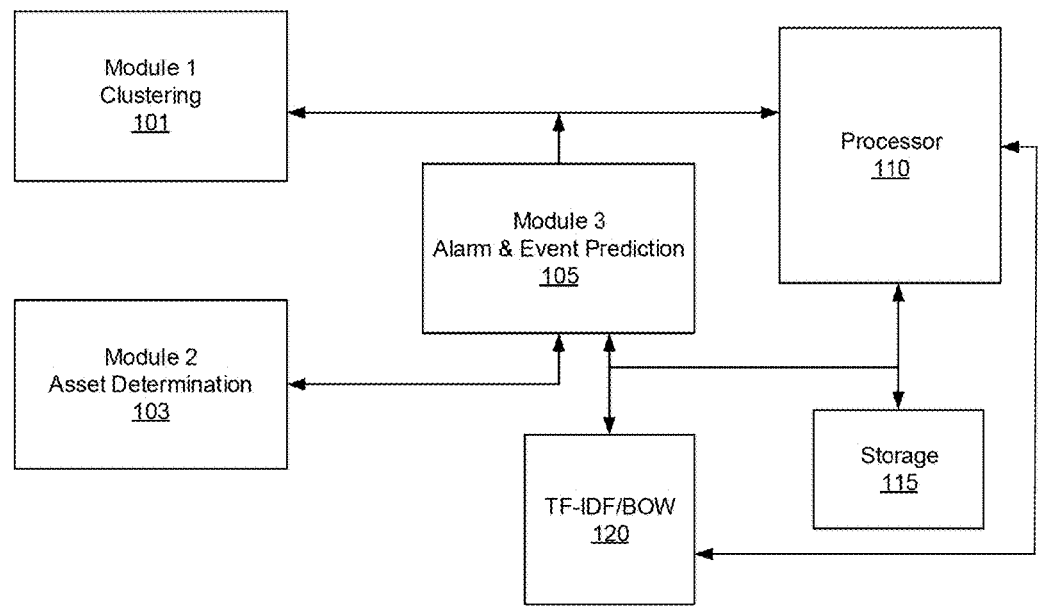
FIG. 1 is a block diagram providing an overview of an architecture of a computer device configured for asset modeling using language processing methods, consistent with an illustrative embodiment.

FIG. 1 a block diagram 100 providing an overview of an architecture of a computer device configured for asset modeling using language processing methods, consistent with an illustrative embodiment.

For example, in FIG. 1 there are three modules shown, a clustering module 101 (e.g., first module), an asset determination module 103 (e.g., second module), and an alarm and event prediction module (105 e.g., third module). It is to be understood that the modules are shown to facilitate understanding of their operations, and there can be more modules or fewer modules, than shown and described herein. A processor 110 is coupled to the modules 101, 103, and 105, and can control the operation of the modules 101, 103, and 105. Storage 115 is coupled to the processor 110. A language processing module (TD-IDF/BOW) 120 operating in conjunction with the third module 105 can store and process various language processing operations in conjunction with the module 105. Language processing operations to perform word representations using, for example at least one of a Bag-of-Words model, a term frequency-inverse document frequency (TF-IDF), or a word vectorization can be performed by the third module 105 in conjunction with the third module 105.

In an illustrative embodiment, the first module 101 is configured to perform the clustering of assets based on static properties (vehicle make, model, and manufacturing information).

The second module 102 is configured to perform a rating of assets that are conditional on operational properties (e.g., dynamic). In the case of vehicle monitoring or testing, the second module may determine what are "good" assets and "bad" assets.

The third module 103 can be configured to perform natural language processing of dynamic and static data, and to predict future "events"/"alarms." For example, the third module 103 can be used to convert into a language domain a numerical data in the events/alarms and perform sequence2sequence methods. Sequence2sequence is a supervised learning algorithm that uses recurrent neural networks (RNN) and convolutional neural networks (CNN) to map a sequence in one domain to a sequence in another domain. The third module 105 can use the clusters generated by the first module 101 to aid in event predictions. The third module 105 can be used for applications that support optimal process learning, and to diagnose problems in asset quality.

Figure 2:
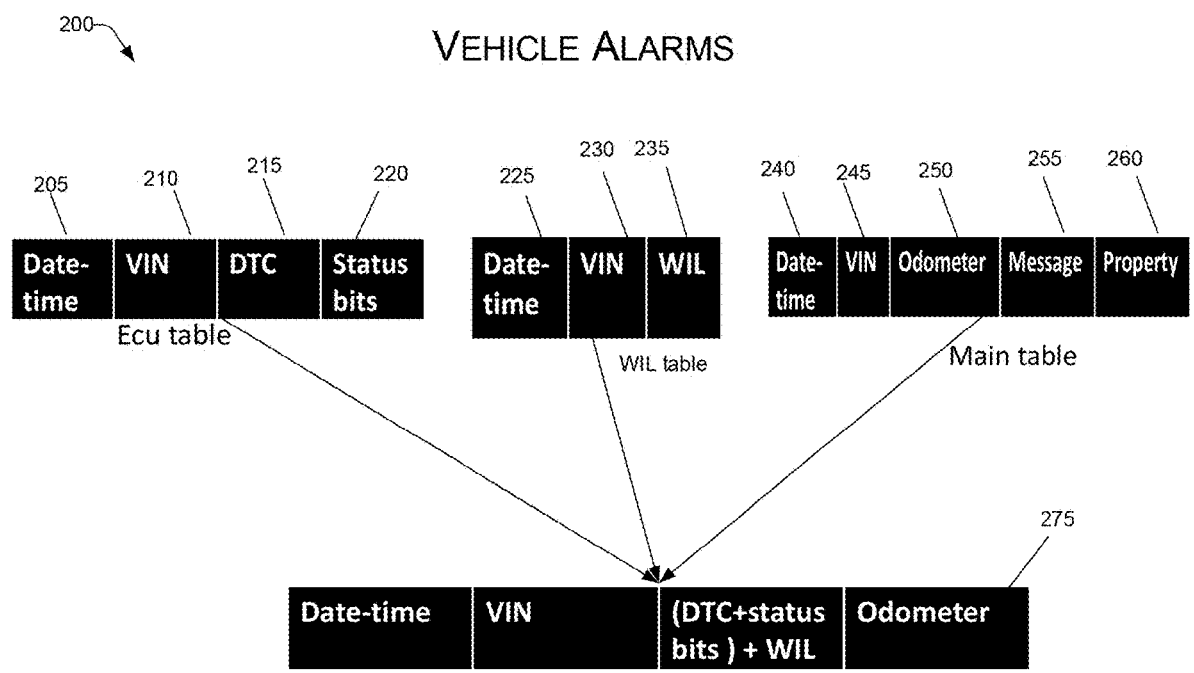
FIG. 2 illustrates a grouping of the dynamic data of a vehicle alarm application, consistent with an illustrative embodiment.

FIG. 2 illustrates a grouping of the dynamic data 200 of a vehicle alarm application, consistent with an illustrative embodiment. There are four tables shown, an electronic control unit (Ecu) Table, a Warning Indicator Lights (WIL) Table, and a Main table which are merged into a single table 275. Information such as date-time 205, VIN 210, DTC 215, Status bit 220 is stored in the ECU table. The WIL table includes the data-time 225 of each of the warning lights, the VIN 225, and the respective warning indicator lights 235. The main table includes the sensor data, and includes the date-time 240, VIN 245, Odometer 250, Message 255, and property 260. The merged table 275 is used for alarm prediction.

Figure 3:
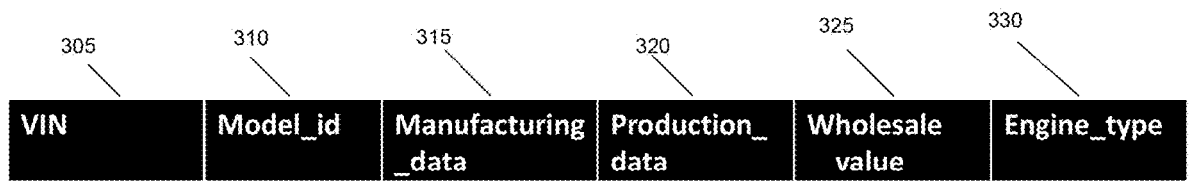
FIG. 3 illustrates the static data of a vehicle alarm application, consistent with an illustrative embodiment.

FIG. 3 illustrates the static data 300 of a vehicle alarm application, consistent with an illustrative embodiment. The VIN 305, Model_id, manufacturing data 315, production data 320, wholesale value 325, and engine type 330 are some of the information forming the static data. The static data is used for clustering vehicle information, such as particular models, etc., based on similar information.

FIG. 4 illustrates the identifying of "good" assets 400 of vehicles, consistent with an illustrative embodiment. For example, a "good" asset of a vehicle would include discriminating information 405, such as the frequency of a particular alarm or alarms over a certain interval of time (e.g., weeks). In addition, a malfunction indicator lamp (MIL) being less than a certain number over the interval of time can be criteria to determine the asset is "good."

Figure 5:
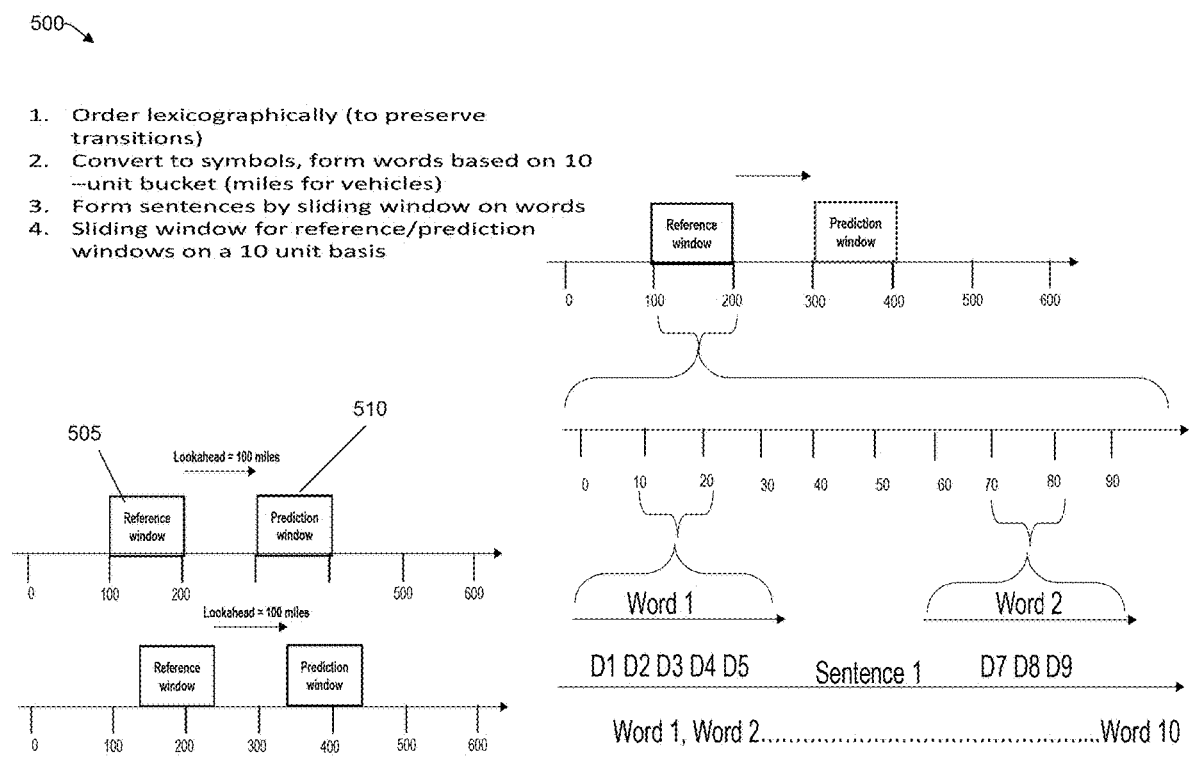
FIG. 5 illustrates an example of using language to predict alarms, consistent with an illustrative embodiment.

FIG. 5 illustrates an example 500 of an operation using language to predict alarms, consistent with an illustrative embodiment. In FIG. 5, there is a "lookahead" which in this non-limiting example is 100 miles. Data from a reference window 505 can be used to predict alarm information in a prediction window 510. Numerical data are converted to symbols using language processing to form words based on unit buckets (e.g., 10 miles). Words can be formed by sliding windows for a reference prediction (e.g., a user sliding the window across a screen. the words are formed below related to the prediction.

Figure 6:
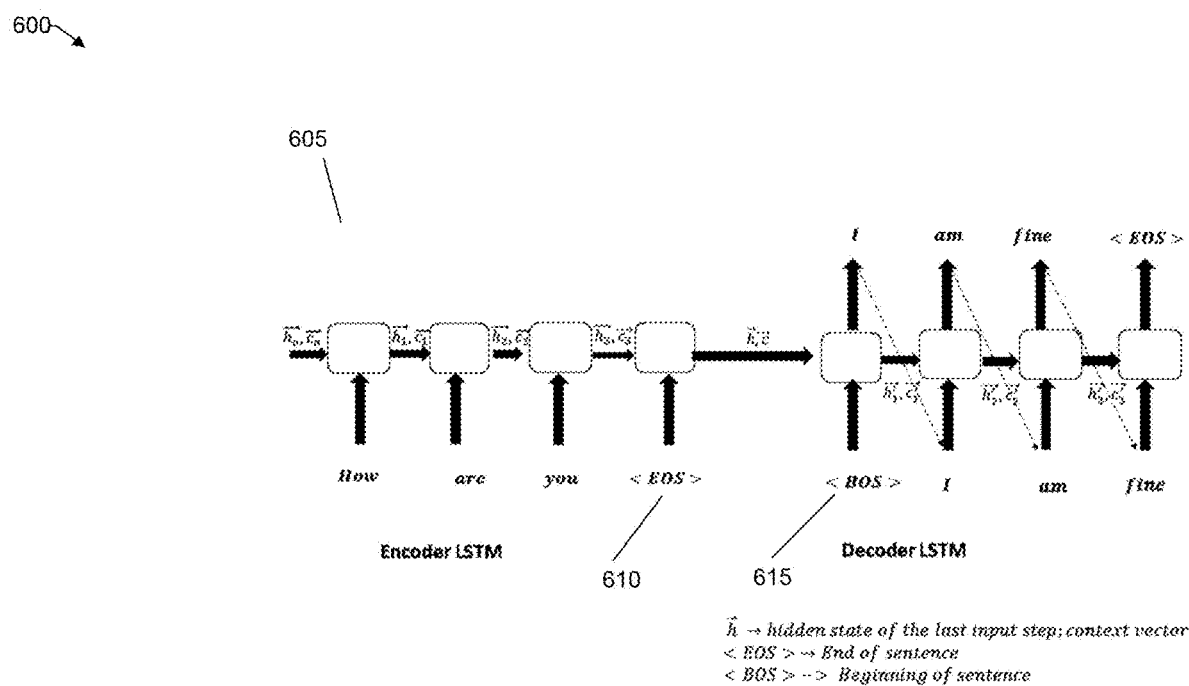
FIG. 6 is an illustration of a sequence-to-sequence of sentence construction from word representations, consistent with an illustrative embodiment.

FIG. 6 is an illustration of a sequence-to-sequence 600 operation for a sentence construction 605 from word representations, consistent with an illustrative embodiment. Words such as "how are you" with an end of sentence (EOS) 610 indication. A response starting with a beginning of sentence (BOS) 615 indication, and the construction of the reply "I am fine" is shown.

Figure 7:
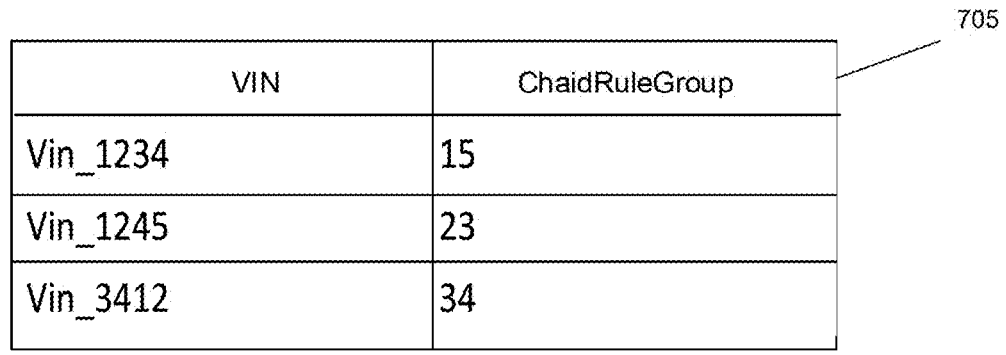
FIG. 7 is an illustration of listing of vehicle identification numbers and a graph of Chi-squared automatic interaction detection data, consistent with an illustrative embodiment.

FIG. 7 is an illustration of listing of vehicle identification numbers and a graph of Chi-squared automatic interaction detection data, consistent with an illustrative embodiment. Chi-squared distribution is defined as a distribution of a sum of squared random variables. The table 705 shows respective vehicle identification numbers (VIN) and their respective Chi-square Automatic Interaction Detector groupings (ChaidRuleGroup) according to their assets. The information may be graphically displayed.

Example Process

With the foregoing overview of the example architecture, it may be helpful now to consider a high-level discussion of an example process. To that end, in conjunction with FIGS. 1, 2, 3, and 4, FIG. 8 is a flowchart 800 for vehicle monitoring using language processing, consistent with an illustrative embodiment. Process 800 is illustrated as a collection of blocks, in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process.

Figure 8:
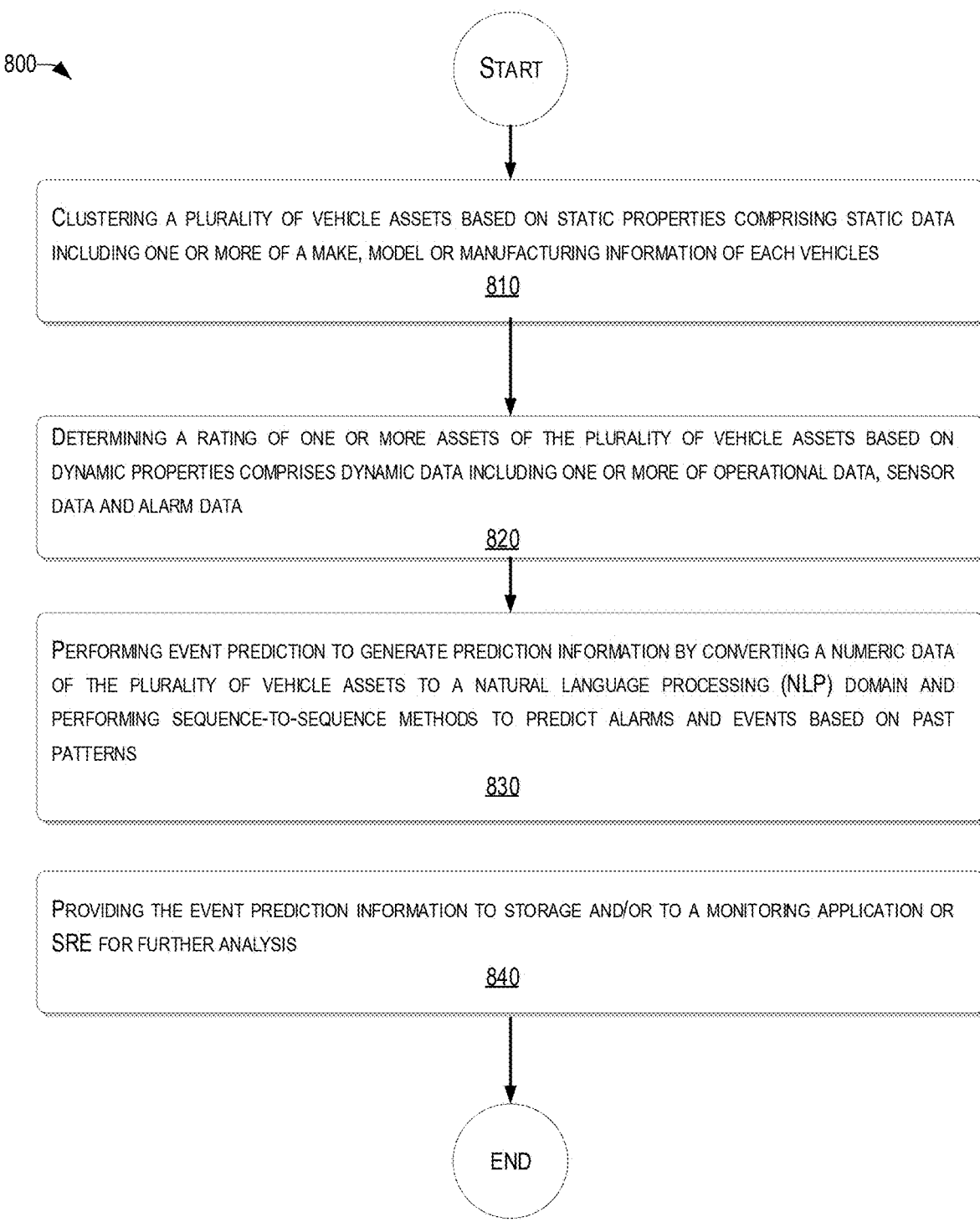
FIG. 8 is a flowchart of a method of vehicle asset modeling using language processing methods, consistent with an illustrative embodiment.

FIG. 8 is a flowchart 800 of a method of vehicle asset modeling using language processing consistent with an illustrative embodiment. It is to be understood that the present disclosure is not limited to the operations of the method as described herein, and may be applied to other types of domains.

At operation 810, the first module 101 performs clustering of a plurality of vehicle assets based on static properties, such as static data including one or more of a make, model, or manufacturing information of each of the vehicle assets.

At operation 820, the second module 103 determines a rating of one or more of a plurality of vehicle assets having dynamic properties. For example, operational data, sensor, and/or alarm data. The second module 103 shown in FIG. 1 may be configured to perform the asset determination. The second module 103 can be configured to determine whether the assets are "good", not good, or "bad" based on the conditional of operational properties (e.g., dynamic properties).

At operation 830, the third module 103 performs event prediction by converting numeric data generated by the plurality of assets to a natural language processing domain. The assets in a conversion operation can include both dynamic data and static data. Applications such as the Bag of Words (BOW), a term frequency-inverse document frequency (TF-IDF) application, or a word vectorization application are examples of applications that can be used to form the conversion of assets. The events/alarms can be converted to symbols in the language domain, which are used for word formation, and subsequently, sentence generation can be used for sequence generation to predict future alarms and events based on past patterns. With regard to FIG. 1, the third module 105 can perform the tasks in operations 830.

FIG. 1 also shows a language processing module 120 (TF-IDF/BOW) that may store various language processing applications in conjunction with the third module 105 and perform additional language processing operations. At operation 830, the third module 105 may also perform sequence-to-sequence methods to predict alarms and events based on past patterns. As discussed hereinabove, the sequence-to-sequence methods may include a supervised learning algorithm that uses recurrent neural networks (RNN) and convolutional neural networks (CNN) to map a sequence in one domain to a sequence in another domain. The third module 105 can use the clusters generated by the first module 101 to aid in event predictions. The third module 105 can be used for an application that supports optimal process learning, and to diagnose problems in asset quality.

At operation 840, the event prediction information generated by operation 830 is provided to storage. Alternatively, or in addition, the event prediction information is provided to a monitoring application. In one embodiment, the event prediction information can be used for further analysis, such as a determination of root causes.

Although the process 800 ends after operation 840, there can be additional operations performed. For example, the third module 105 can create a word embedding model by converting the numeric data from a semiconductor domain to the NLP domain, and determine a rating of a plurality of vehicles based on the asset rating. As shown and discussed with regard to FIGS. 1, 2, and 3 herein above, the event prediction information can be used to identify groups of vehicle assets that have desired qualities. Thus, the vehicles can be determined to be "good" or "bad" based on the asset rating.

Figure 9:
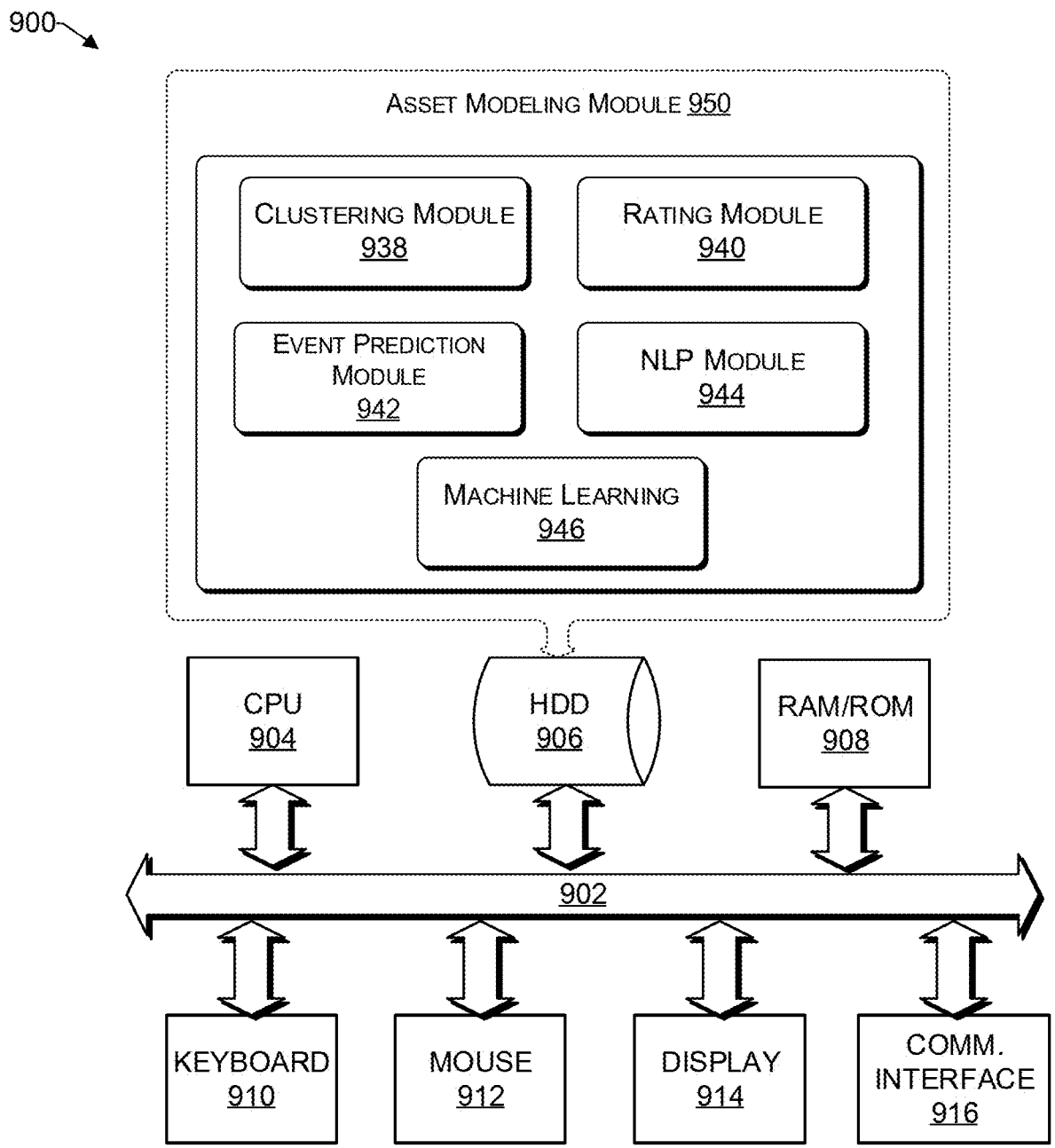
FIG. 9 is a functional block diagram illustration of a computer hardware platform that can communicate with various networked components, consistent with an illustrative embodiment.

FIG. 9 provides a functional block diagram illustration 900 of a computer hardware platform. In particular, FIG. 9 illustrates a particularly configured network or host computer platform 900, as may be used to implement the method shown in FIG. 8. The computer platform 900 may include a central processing unit (CPU) 904, a hard disk drive (HDD) 906, random access memory (RAM) and/or read-only memory (ROM) 908, a keyboard 910, a mouse 912, a display 914, and a communication interface 916, which are connected to a system bus 902. The HDD 906 can include data stores.

In one embodiment, the HDD 906, has capabilities that include storing a program that can execute various processes, such as for executing an asset modeling module 950, in a manner described herein. The asset modeling module 950 provides the overall management of the selected models for asset modeling using language processing. A clustering module 948, which may function as the first module 101 shown and described in FIG. 1, is configured to cluster static data, or various snapshots of historical data of what was at one-time dynamic operations. A rating module 940, which may function as the second module 103 shown and described in FIG. 1, can be configured to rate certain vehicle asset data as good, or bad, based on criteria discussed herein above in conjunction with FIGS. 2, 3, and 4. An event prediction module 942, which may function as the third module 105 shown and described in FIG. 1, can be configured to predict future events or alarms, and convert numerical sensor and operational data to a language domain by performing a sequence-to-sequence method.

A Natural Language Processing module 944 may operate in conjunction, for example, with the event prediction module 942. The events/alarms can be converted to symbols in the language domain, which are used to form words and subsequently sentences used for sequence generation to predict future alarms and events based on past patterns.

A machine learning module 946 can be trained with training samples of historical data that can be used to increase the accuracy of the operation of the other modules, particularly in predicting events/alarms and in rating whether a vehicle's assets are good or bad, or close to an ideal or goal set of measurements (e.g., diagnostics) of a vehicle, without necessarily making such measurements. There can be various modules configured to perform different functions that can vary in quantity.

For example, the training sample module 942 stores various data to train the processor with a machine learning module 940 configured to perform machine learning regarding workload management including determining reconciliation time and reconciliation periods for each of identified operations as discussed herein above.

In one embodiment, a program, such as Apache™, can be stored for operating the system as a Web server. In one embodiment, the HDD 906 can store an executing application that includes one or more library software modules, such as those for the Java™ Runtime Environment program for realizing a JVM (Java™ virtual machine).

Example Cloud Platform

As discussed above, functions relating to environmental and ecological optimization methods may include a cloud. It is to be understood that although this disclosure includes a detailed description of cloud computing as discussed herein below, implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Figure 10:
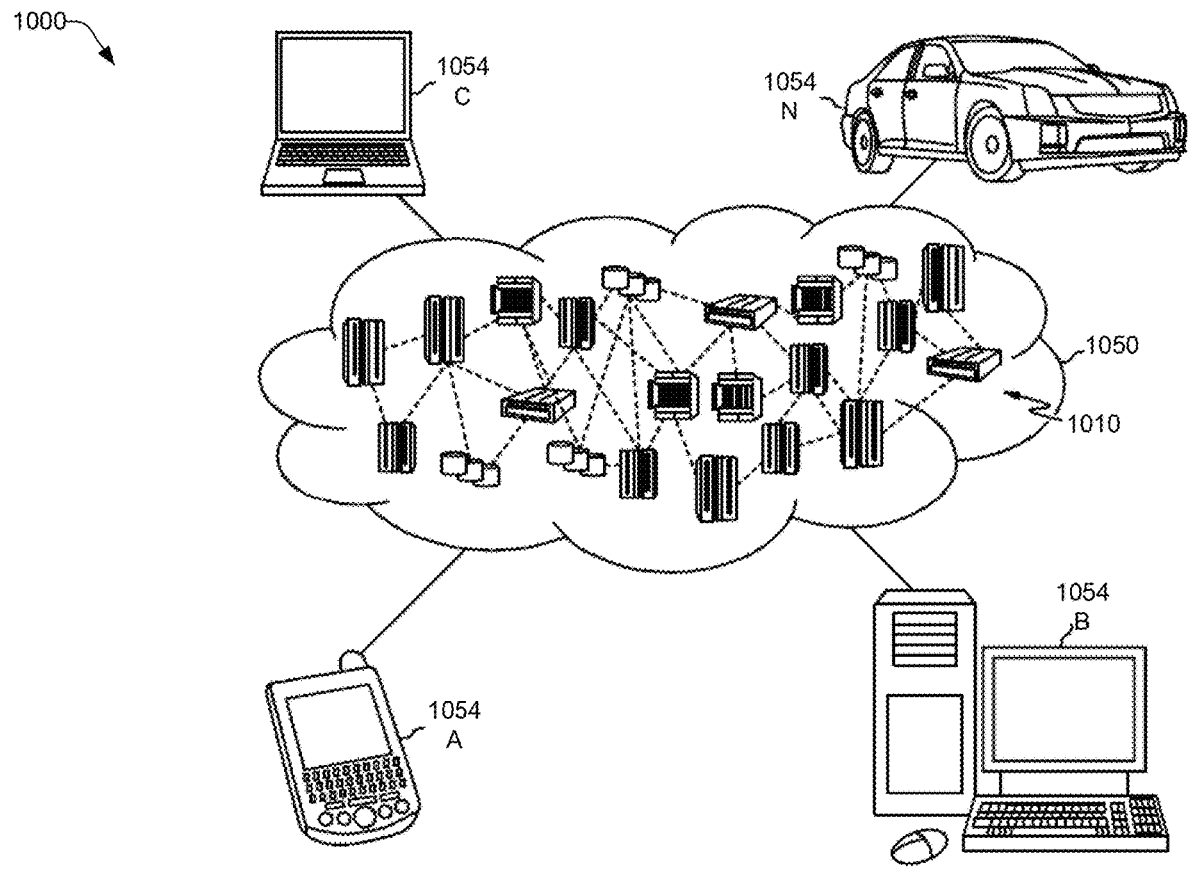
FIG. 10 depicts an illustrative cloud computing environment utilizing cloud computing.

Referring now to FIG. 10, an illustrative cloud computing environment 1000 utilizing cloud computing is depicted. As shown, cloud computing environment 1000 includes cloud 1050 having one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms, and/or software as services for which a cloud consumer does not need to maintain resources on a local computing device. It is understood that the types of computing devices 1054A-N shown in FIG. 10 are intended to be illustrative only and that computing nodes 1010 and cloud computing environment 1050 can communicate with any type of computerized device over any type of network and/or network addressable connection (e.g., using a web browser).

Figure 11:
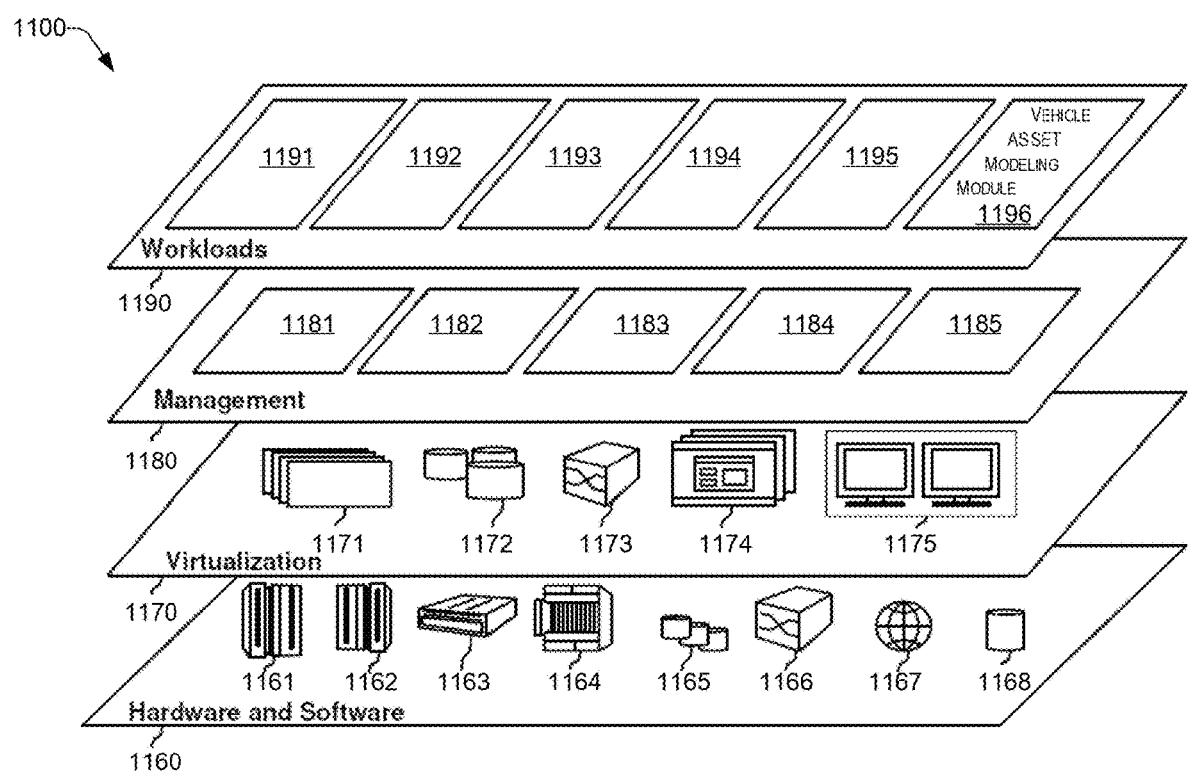
FIG. 11 depicts a set of functional abstraction layers provided by a cloud computing environment.

Referring now to FIG. 11, a set of functional abstraction layers 1100 provided by cloud computing environment 1000 (FIG. 10) is shown. It should be understood in advance that the components, layers, and functions shown in FIG. 11 are intended to be illustrative only and embodiments of the disclosure are not limited thereto. As depicted, the following layers and corresponding functions are provided:

Hardware and software layer 1160 include hardware and software components. Examples of hardware components include: mainframes 1161; RISC (Reduced Instruction Set Computer) architecture based servers 1162; servers 1163; blade servers 1164; storage devices 1165; and networks and networking components 1166. In some embodiments, software components include network application server software 1167 and database software 1168.

Virtualization layer 1170 provides an abstraction layer from which the following examples of virtual entities may be provided: virtual servers 1171; virtual storage 1172; virtual networks 1173, including virtual private networks; virtual applications and operating systems 1174; and virtual clients 1175.

In one example, management layer 1180 may provide the functions described below. Resource provisioning 1181 provides dynamic procurement of computing resources and other resources that are utilized to perform tasks within the cloud computing environment. Metering and Pricing 1182 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1183 provides access to the cloud computing environment for consumers and system administrators. Service level management 1184 provides cloud computing resource allocation and management such that required service levels are met. Service Level Agreement (SLA) planning and fulfillment 1185 provide pre-arrangement for, and procurement of, cloud computing resources for which a future requirement is anticipated in accordance with an SLA.

Workloads layer 1190 provides examples of functionality for which the cloud computing environment may be utilized. Examples of workloads and functions which may be provided from this layer include: mapping and navigation 1191; software development and lifecycle management 1192; virtual classroom education delivery 1193; data analytics processing 1194; transaction processing 1195; and a vehicle asset modeling model 1196 to perform event prediction and identify predicting vehicle alarms and identifying vehicle assets, as discussed herein.

Conclusion

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

The components, steps, features, objects, benefits, and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

The flowchart, and diagrams in the figures herein illustrate the architecture, functionality, and operation of possible implementations according to various embodiments of the present disclosure.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any such actual relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, the inventive subject matter lies in less than all features of a single disclosed embodiment. Thus, the following claims are hereby incorporated into the Detailed Description, with each claim standing on its own as a separately claimed subject matter.

What is claimed is:

1. A computing device comprising:
   a processor;
   a storage device for content and programming coupled to the processor;
   a vehicle asset modeling module stored in the storage device, wherein an execution of the vehicle asset modeling module by the processor configures the computing device to perform acts comprising:
   identifying and clustering a plurality of assets based on static properties of a vehicle asset using a first module of the vehicle asset modeling module;
   determining a rating of one or more assets of the clustered plurality of assets based on dynamic properties of the vehicle asset, by a second module of the vehicle asset modeling module;
   performing an event prediction by converting a numeric data of the clustered plurality of assets to a natural language processing (NLP) domain by a third module of the vehicle asset modeling module;
   performing one or more sequence-to-sequence methods to predict a malfunction of a component of the vehicle asset and/or an event based on past patterns, by the third module of the vehicle asset modeling module; and
   storing information related to the event prediction and malfunction prediction in the storage device.

2. The computing device according to claim 1, wherein:
   the static properties of the assets comprise static data including one or more of a make, a model, or a manufacturing information of each of the assets;
   the dynamic properties of the assets comprise dynamic data including one or more of an operational data, a sensor data, or an alarm data; and
   the third module is configured to convert one or more of the static data and the dynamic data to the NLP domain by finding word representations using at least one of a Bag-of-Words model, a term frequency-inverse document frequency (TF-IDF), or word vectorization.

3. The computing device according to claim 1, wherein the numeric data is converted from an Internet of things (IOT) domain to the NLP domain by creating a word embedding model of the numeric data performing at least one of a cluster analysis, a difference measurement analysis, or a predictive model development.

4. The computing device according to claim 1, wherein the rating of the one or more assets determined by the second module comprises a description based on a conditional characteristic.

5. The computing device according to claim 1, wherein:
the third module is configured to convert the numeric data from a vehicle domain to the NLP domain by creating a word embedding model of the numeric data of a vehicle, and
the second module is configured to determine a rating of the assets of the vehicle.

6. The computing device according to claim 5, wherein the word embedding model of the numeric data is created using at least one of a Bag-of-Words (BOW) model, a term frequency-inverse document frequency (TF-IDF), or a word vectorization.

7. The computing device according to claim 6, wherein one or more of the plurality of vehicles are rated as one of good or bad according to the determined rating of the assets.

8. The computing device according to claim 7, wherein the third module is further configured to use the BOW model to create the word embedding model of the numeric data by determining BOW vectors.

9. The computing device according to claim 7, wherein the third module is further configured to use the TF-IDF to create the word embedding model of the numeric data.

10. The computing device according to claim 9, wherein the third module is configured to create the word embedding by forming words based on unit buckets comprising a predetermined distance for each bucket.

11. A computer-implemented method for vehicle asset modeling using natural language processing, the method comprising:
clustering a plurality of vehicle assets based on static properties of a vehicle comprising static data including one or more of a make, a model, or a manufacturing information of each of the vehicle assets;
determining a rating of one or more assets of the plurality of vehicle assets based on dynamic properties, wherein the dynamic properties comprise dynamic data including one or more of operational data, sensor data, or alarm data; and
predicting a target event or a failure event by converting a numeric data of the plurality of the vehicle assets to a natural language processing (NLP) domain.

12. The computer-implemented method according to claim 11, further comprising converting one or more of the static data and the dynamic data to the NLP domain by finding word representations using at least one of a Bag-of-Words model, a term frequency-inverse document frequency (TF-IDF), or a word vectorization.

13. The computer-implemented method according to claim 11, wherein converting the numeric data is performed from an Internet-of-things (IOT) domain to the NLP domain by creating a word embedding model of the numeric data performing at least one of a cluster analysis, a difference measurement analysis, or a predictive model development.

14. The computer-implemented method according to claim 11, further comprising determining the rating of the one or more of the plurality of vehicle assets based on a conditional characteristic.

15. The computer-implemented method according to claim 11, further comprising:
creating a word embedding model by converting the numeric data from a vehicle domain to the NLP domain; and
determining a rating of vehicle assets.

16. The computer-implemented method according to claim 15, further comprising creating the word embedding model of the numeric data by using at least one of a Bag-of-Words (BOW) model, a term frequency-inverse document frequency (TF-IDF), or a word vectorization.

17. The computer-implemented method according to claim 16, wherein creating the word embedding model of the numeric data by the BOW model includes determining BOW vectors.

18. The computer-implemented method according to claim 15, further comprising rating one or more of the plurality of vehicle assets as one of good or bad based on a quantity of alarms.

19. The computer-implemented method according to claim 15, further comprising configuring the third module to create the word embedding by forming words based on unit buckets comprising a predetermined distance for each bucket.

20. A computer-implemented method of identifying a candidate root cause of an alarm in a vehicle, comprising:
identifying and clustering a plurality of assets based on static properties of a vehicle asset using a first module of the vehicle asset modeling module;
determining a rating of one or more assets of the clustered plurality of assets based on dynamic properties of the vehicle asset, by a second module of the vehicle asset modeling module;
performing an event prediction by converting a numeric data of the clustered plurality of assets to a natural language processing (NLP) domain by a third module of the vehicle asset modeling module;
performing one or more sequence-to-sequence methods to predict a malfunction of a component of the vehicle asset and/or an event based on past patterns, by the third module of the vehicle asset modeling module; and
storing information related to the event prediction and malfunction prediction in the storage device.

* * * * *